(12) United States Patent
Young et al.

(10) Patent No.: US 7,211,280 B1
(45) Date of Patent: May 1, 2007

(54) CONDITION OF ELDERLY PETS

(75) Inventors: Linda A. Young, St. Joseph, MO (US); Gail Czarnecki, Easton, MO (US)

(73) Assignee: Nestec S.A., Vevey (CH)

( * ) Notice: Subject to any disclaimer, the term of this patent is extended or adjusted under 35 U.S.C. 154(b) by 648 days.

(21) Appl. No.: 10/070,777

(22) PCT Filed: Sep. 8, 2000

(86) PCT No.: PCT/EP00/08870

§ 371 (c)(1),
(2), (4) Date: Jul. 22, 2002

(87) PCT Pub. No.: WO01/17366

PCT Pub. Date: Mar. 15, 2001

Related U.S. Application Data

(60) Provisional application No. 60/152,984, filed on Sep. 9, 1999.

(51) Int. Cl.
*A23K 1/00* (2006.01)

(52) U.S. Cl. .............................. 426/2; 426/61; 426/72; 426/74; 426/615; 426/805

(58) Field of Classification Search ................ 426/2, 426/61, 72, 74, 615, 805, 605
See application file for complete search history.

(56) References Cited

U.S. PATENT DOCUMENTS 5,756,088 A * 5/1998 Matsuura et al. .......... 424/93.4
6,238,708 B1 * 5/2001 Hayek et al. ................ 426/2
6,310,090 B1 * 10/2001 Hayek ........................ 514/458
6,391,375 B1 * 5/2002 Fone ........................... 426/635

FOREIGN PATENT DOCUMENTS

| EP | 0 850 569 A1 | 7/1998 |
| EP | 0 862 863 A2 | 9/1998 |
| WO | WO 98/56263 | 12/1998 |

OTHER PUBLICATIONS

Meydani et al., Vitamin E and Immune Response in Aged Dogs, Iams Nutrition Symposium Proceedings, 1998, pp. 295-303, vol. II.*
Keeping Current, "Antioxidant Vitamins in Pet Food", KC 9602, BASF 1995.*
Keeping Current, Natural-Derived Antioxidants: Science or Marketing, KC 9506, BASF, 1999.*
Animal Nutrition Partner, BASF, Spring 1998.*
Fromageot et al. "Influence De L'Alimentation Du Chien Sur Sa Peau Et Son Pelage" *Rec. Med. vet.*, 1982, vol. 158, No. 12, pp. 821-826.
Lowe "Canine Nutrition—Recent Advances" *Biotechnology in the Feed Industry*, pp. 275-287.

* cited by examiner

*Primary Examiner*—C. Sayala
(74) *Attorney, Agent, or Firm*—Bell, Boyd & Lloyd LLP

(57) ABSTRACT

A method is provided for improving the condition and/or increasing the longevity of elderly pets. The elderly pet is administered an effective amount of a nutritional composition which contains a calcium source and an antioxidant source, such as of vitamins or vitamin precursors which have antioxidant properties. Examples of such vitamins and precursors include β-carotene and vitamin E.

22 Claims, No Drawings

CONDITION OF ELDERLY PETS

This application is a 371 of PCT/EP00/08870 filed Sep. 8, 2000 which claims priority from U.S. Provisional Application Ser. No. 60/152,984 filed Sep. 9, 1999.

FIELD OF THE INVENTION

This invention relates to a composition for improving the condition of elderly pets. The invention also relates to a method for improving the condition of elderly pets.

BACKGROUND OF THE INVENTION

Elderly pets often become frail in their last few years of life. From an appearance point of view, they become thin and have poor skin and coat condition. Other symptoms include weight gain, increased water intake, digestive system problems, and joint stiffness and energy loss or lower activity levels in general. Also, the density of their bones may decrease making them susceptible to bone breakage. Further, elderly pets may be more susceptible to cancers than younger animals.

Certain of these problems may be effectively treated using medication. However, a better alternative would be to delay the onset of these problems, or treat these problems, through diet adjustments. In particular, elderly animals should be fed a balanced, maintenance food that contains high quality protein, lower amounts of fat to reduce energy intake, dietary fiber, and antioxidants.

However, despite the use of balanced, maintenance foods, the condition of elderly animals may deteriorate rapidly. Therefore there is a need for nutritional ways of improving the condition and/or increasing the longevity of elderly pets.

SUMMARY OF THE INVENTION

Accordingly, in one aspect, this invention provides a method for maintaining or improving the condition of elderly pets, the method comprising administering to the pet an effective amount of a nutritional composition which contains a calcium source and a source of antioxidant. The said antioxidant source may be selected from sources of vitamins and vitamin precursors. In a preferred embodiment, the source is selected from sources of vitamin E, vitamin C and β-carotene.

It is surprisingly found that the condition of elderly pets, which are administered a calcium source and a source of a nutritional agent, such as a vitamin or a vitamin precursor which has antioxidant properties, markedly improves. Further, the survivability and hence longevity of the pets improve.

In a further aspect, this invention provides a method for increasing the longevity of elderly pets, the method comprising administering to the pet an effective amount of a nutritional composition which contains a calcium source and a source of an antioxidant. The antioxidant source may be selected from the group of sources of vitamins and vitamin precursors.

Preferably, the nutritional composition includes a source of zinc. The nutritional composition may also contain a source of glutamine.

The invention extends further to a method of increasing the quality of life of an elderly pet, the method comprising administering to the pet a nutritional composition which contains a calcium source, a zinc source and a source of an antioxidant. The antioxidant source may be selected from β-carotene vitamin C and vitamin E.

The composition preferably is administered in an amount effective to increase the activity level of the pet.

According to a further aspect, the invention provides a method of increasing the activity level of an elderly pet, the method comprising administering to the pet an effective amount of a nutritional composition which contains a calcium source, a zinc source and a source of an antioxidant. The antioxidant source may be selected from, β-carotene and vitamin E.

The nutritional composition may also include a nutritional agent which promotes the growth of bifido- and lactic-bacteria in the gastro-intestinal tract of the pet. For example, the nutritional agent may be a prebiotic or a probiotic micro-organism.

Preferably, the nutritional composition is a complete and nutritionally balanced pet food.

In another aspect, this invention provides a pet food for elderly pets, the pet food comprising a protein source, a lipid source, a calcium source, a zinc source, β-carotene and vitamin E.

The pet food may comprise at least about 3 g/1000 kcal of calcium, at least about 50 mg/1000 of zinc, at least about 5 mg/1000 kcal of β-carotene, and at least about 150 IU/1000 kcal of vitamin E.

"Prebiotic" means a substance or compound which is fermented by the intestinal flora of the pet and hence promotes the growth or development of bifido- and lactic-bacteria in the gastro-intestinal tract of the pet at the expense of pathogenic bacteria. The result of this fermentation is a release of fatty acids, in particular short-chain fatty acids in the colon. This has the effect of reducing the pH value in the colon.

"Probiotic micro-organism" means a micro-organism which beneficially affects a host by improving its intestinal microbial balance (Fuller, R; 1989; *J. Applied Bacteriology*, 66: 365–378). In general, probiotic micro-organisms produce organic acids such as lactic acid and acetic acid which inhibit the growth of pathogenic bacteria such as *Clostridium perfringens* and *Helicobacter pylori*.

DETAILED DESCRIPTION OF THE PREFERRED EMBODIMENTS

Embodiments of the invention are now described by way of example only. The invention is based upon the finding that the administration to an elderly pet of an effective amount of a calcium source and a source of an antioxidant having antioxidant properties, improves the condition and/or longevity of the pet. By "elderly" is meant a pet of age 7 years or more, although in certain cases, younger pets may exhibit characteristics and conditions generally associated with older animals. In preferred embodiments, the source of antioxidant is a source of vitamins or vitamin precursors.

The calcium source and the source of vitamins which have antioxidant properties, are administered as part of a nutritional composition. The nutritional composition is conveniently formulated into a pet food. The pet food may be any suitable pet food, for example a canned pet food, a semi-moist pet food, or a dried pet food. Further, the exact composition of the pet food is not critical.

The pet food thus contains a source of antioxidants, advantageously selected from the group of sources of vitamins and vitamin precursors. Suitable examples of such antioxidants include β-carotene, vitamin E and vitamin C. Preferably the pet food contains β-carotene and vitamin E.

If β-carotene is used, it may be present in an amount above about 4 mg/1000 kcal. For example, the nutritional composition may contain about 5 mg/1000 kcal of β-carotene. The vitamin E may be present in an amount of above about 75 IU/1000 kcal; for example above about 150 IU/1000 kcal.

The pet food contains a calcium source. Suitable calcium sources include calcium carbonate, calcium phosphate (di or tribasic), calcium chloride, calcium citrate bone meal (or bones, for example, chicken necks & backs), or other bioavailable sources of calcium. The pet food preferably contains about 1.5 g/1000 kcal to about 6 g/1000 kcal of calcium; for example about 4.5 g/1000 kcal.

The pet food may also contain vitamin D, vitamin K and zinc. The vitamin D may be present in an amount of about 500 IU/1000 kcal to about 190000 IU/1000 kcal. The vitamin K may be present in an amount of above about 0.07 mg/1000 kcal; for example about 0.125 mg/1000 kcal. Other minerals and vitamins may also be included.

The pet food preferably contains a source of zinc. Zinc may be provided, by way of example, in the form of zinc sulfate, zinc oxide and zinc-methionine. Further, many ingredients commonly used in pet foods are sources of zinc. The pet food preferably contains about 50 mg/1000 kcal to 500 mg/1000 kcal of zinc.

The pet food may contain a protein source. Any suitable protein source may be used. Suitable protein sources may be selected from any suitable animal or vegetable protein source; for example muscular or skeletal meat, meat and bone meal, poultry meal, fish meal, milk proteins, corn gluten, wheat gluten, soy flour, soy protein concentrates, soy protein isolates, egg proteins, whey, casein, gluten, and the like. For elderly animals, it is preferred for the protein source to contain a high quality animal protein.

The amount of protein provided by the protein source may be selected as desired. For example, the pet food may contain about 12% to about 70% by weight of protein on a dry basis.

The pet food may contain a carbohydrate source. Any suitable carbohydrate source may be used. Preferably the carbohydrate source is provided in the form of grains, flours and starches. For example, the carbohydrate source may be rice, barley, sorghum, millet, oat, corn meal or wheat flour. Simple sugars such as sucrose, glucose and corn syrups may also be used.

The amount of carbohydrate provided by the carbohydrate source may be selected as desired. For example, the pet food may contain up to about 60% by weight of carbohydrate.

The pet food may contain a fat source. Any suitable fat source may be used; both animal fats and Vegetable fats. Preferably the fat source is an animal fat source such as tallow. Vegetable oils such as corn oil, sunflower oil, safflower oil, rape seed oil and the like, may also be used. If desired, the fat source may include long chain fatty acids. Suitable long chain fatty acids include alpha-linoleic acid, gamma linolenic acid, linoleic acid, eicosapentanoic acid, and docosahexanoic acid. Fish oils are a suitable source of eicosapentanoic acids and dicosahexanoic acid. Borage oil, blackcurrent seed oil and evening primrose oil are suitable sources of gamma linolenic acid. Safflower oils, sunflower oils, corn oils and soy bean oils are suitable sources of linoleic acid.

The amount of fat provided by the fat source may be selected as desired. For example, the pet food may contain about 5% to about 50% by weight of fat on a dry basis. Preferably, the pet food has a relatively reduced amount of fat.

The exact composition of the protein source, the carbohydrate source and the fat source is not critical and will be selected based upon palatability, availability, cost and processing considerations.

The pet food may also include additional ingredients such as salts, spices, seasonings, flavoring agents, gums, prebiotics and probiotic micro-organisms. Suitable prebiotics include oligosaccharides, such as inulin and its hydrolysis products commonly known as fructooligosaccharides, galacto-oligosaccharides, xylo-oligosaccharides or oligo derivatives of starch.

The prebiotics may be provided in any suitable form. For example, the prebiotic may be provided in the form of plant material which contains the prebiotic. Suitable plant materials includes asparagus, artichokes, onions, wheat or chicory, or residues of these plant materials. Alternatively, the prebiotic may be provided as an inulin extract or a hydrolyzed inulin extract. Extracts from chicory are particularly suitable. Suitable inulin extracts are commercially available.

The probiotic micro-organism may be selected from one or more micro-organisms suitable for animal consumption and which is able to improve the microbial balance in the intestine.

Examples of suitable probiotic micro-organisms include yeasts such as *Saccharomyces, Debaromyces, Candida, Pichia* and *Torulopsis*, moulds such as *Aspergillus, Rhizopus, Mucor,* and *Penicillium* and *Torulopsis* and bacteria such as the genera *Bifidobacterium, Bacteroides, Fusobacterium, Melissococcus, Propionibacterium, Streptococcus, Enterococcus, Lactococcus, Staphylococcus, Peptostrepococcus, Baccillus, Pediococcus, Micrococcus, Leuconostoc, Weissella, Aerococcus, Oenococcus* and *Lactobacillus*. Specific examples of suitable probiotic micro-organisms are: *Saccharomyces cereviseae, Bacillus coagulans, Bacillus licheniformis, Bacillus subtilis, Bifidobacterium bifidum, Bifidobacterium infantis, Bifidobacterium longum, Enterococcus faecium, Enterococcus faecalis, Lactobacillus acidophilus, Lactobacillus alimentarius, Lactobacillus casei* subsp. *casei, Lactobacillus casei Shirota, Lactobacillus curvatus, Lactobacillus delbruckii* subsp. *lactis, Lactobacillus farciminus, Lactobacillus gasseri, Lactobacillus helveticus, Lactobacillus johnsonii, Lactobacillus reuteri, Lactobacillus rhamnosus (Lactobacillus GG), Lactobacillus sake, Lactococcus lactis, Micrococcus varians, Pediococcus acidilactici, Pediococcus pentosaceus, Pediococcus acidilactici, Pediococcus halophilus, Streptococcus faecalis, Streptococcus thremophilus, Staphylococcus carnosus,* and *Staphylococcus xylosus.* The probiotic micro-organisms may be in powdered, dried form; especially in spore form for micro-organisms which form spores. Further, if desired, the probiotic micro-organism may be encapsulated to further increase the probability of survival; for example in a sugar matrix, fat matrix or polysaccharide matrix. Alternatively, the micro-organism may be applied to a body or particle of pet food such as kibble in a coating mixture. Such mixture may comprise a lipid-based carrier and suitable preserving or protective agents for the micro-organism. Further alternatively, it may be provided as a separately contained supplement to the main food composition, such as for example in a sachet provided with the composition in its packaged form, preferably at point of sale.

The pet food may also include a glutamine source. Suitable sources of glutamine include glutamine in free amino acid form, glutamine in di-peptide form and proteins obtained sorghum, millet, oat, and carob. Gluten also provides a suitable source of glutamine.

The pet food may be produced using any suitable process. Suitable processes for wet products include the following:

Process (i): To produce a thermally gelled emulsion which sets upon cooling, a suitable meat material is comminuted to produce a meat batter. Suitable gelling agents, for example starches and gums such as kappa-carrageenan, locust bean gum, guar gum, and xanthan gum may be added to the meat batter. Usually no more than about 1% by weight of gum is needed.

Water may also be added to meat batter to provide from about 70% to about 85% by weight of moisture. If sufficient moisture is present in the meat material, water need not be added.

The meat batter is then heated to a temperature suitable to initiate thermal gelling of the mixture; for example a temperature of about 40° C. to about 65° C. in a mixer-cooler. Steam may be injected into the meat batter if desired. The heat meat batter may be emulsified if desired. The meat batter is then maintained at a temperature of about 40° C. to about 65° C. until needed. After retorting and cooling to room temperature, the meat batter forms a thermally gelled emulsion which is substantially solid or at least holds its form.

Process (ii): To produce solid food pieces in gravy or gel, solid pieces of meat or other material, or both, may be mixed with a gravy. Solid pieces of other materials may also be used; such as rice grains, pasta or noodles, vegetable pieces, and the like.

The solid food pieces may be in the form of pieces of a thermally gelled matrix. The pieces of the thermally gelled matrix may be produced by any suitable procedure, for example the procedures described in any one of U.S. Pat. Nos. 4,781,939, 5,132,137 and 5,567,466 and PCT application WO 97/02760.

The thermally gelled matrix may be formed in suitable equipment such as an emulsion mill or an extruder to form pieces or chunks. If an extruder is used, the emulsion may be forced through an orifice to provide the emulsion with a desired shape; for example of oval, square or rectangular cross-section. The extrudate may then be cooked in a suitable continuous cooking system; for example a tunnel oven using hot air, steam, mixtures of hot air and steam, or microwaves as the heating medium. The core temperature of the extrudate is raised such that the extrudate undergoes thermal gelling. For example, the core temperature may be raised to at least about 80° C.; for example about 85° C. to about 95° C. The gelled extrudate may then be cut into pieces and the pieces cooled to provide pieces of a thermally gelled matrix. The pieces may be subjected to flaking if desired. The cooling may be carried out by spraying water on the pieces. Alternatively, other cooling media may be used.

If a gravy is used with the solid food pieces, it may be produced from water, one or more starch or gums, and suitable flavoring agents. The gravy preferably comprises about 20% to about 80% by weight of the mixture of solid pieces and gravy. Suitable gums are kappa-carrageenan, locust bean gum, guar gum and xanthan gum.

If a gel is used with the solid food pieces, it may be produced from a suitable gelling agent, water and suitable flavoring agents. The gel preferably comprises about 20% to about 80% by weight of the mixture of solid pieces and gravy. Suitable gelling agents are proteins such as gelatin; gums such as alginates, kappa-carrageenan, locust bean gum, guar gum and xanthan gum, and the like. The gel or aspic may be prepared as is conventional.

Products which use a combinations of the processes described above may also be used. For example, a thermally gelled emulsion may be prepared as described above. Then solid food pieces, which may be pieces of a thermally gelled matrix, meat pieces, vegetable pieces, combinations of these pieces, and the like, are combined with the thermally gelled emulsion. As a further alternative, combinations of thermally gelled emulsions and solid food pieces in gravy or gel, may be used. Suitable combinations are described in WO 98/05218 and WO 98/05219; the disclosures of which are incorporated by reference.

The pet foods are then filled into cans or other containers, the containers sealed, and the products retorted in the normal manner. Suitable equipment is commercially available.

A suitable process for a dried pet food is cooking a feed mixture of the various ingredients, forming the cooked mixture into pellets, drying, and then coating the pellets with flavors. The cooking and forming steps are preferably carried out using an extruder, as is well known in the art. However, the pellets may be produced by other cooking procedures such as baking a preformed food body comprising the selected ingredients, preferably in nutritionally balanced proportions.

The amount of the pet food to be consumed by the pet to obtain a beneficial effect will depend upon the size or the pet, the type of pet and the age of the pet. However an amount of the nutritional composition to provide a daily amount of at least about 0.2 mg/kg body weight of β-carotene, at least about 3 IU/kg body weight of vitamin E, and at least about 0.12 g/kg body weight of calcium, would usually be adequate. Preferably at least about 2 mg/kg body weight of zinc is administered. For example, for a cat weighing about 4 kg, a daily amount of at least about 0.25 mg/kg body weight of β-carotene, at least about 3.5 IU/kg body weight of vitamin E, at least about 0.15 g/kg body weight of calcium and at least about 2.5 mg/kg body weight of zinc, may be fed. For example, for a dog weighing about 20 kg, a daily amount of at least about 0.2 mg/kg body weight of β-carotene, at least about 3 IU/kg body weight of vitamin E, at least about 0.12 g/kg body weight of calcium and at least about 2 mg/kg body weight of zinc, may be fed.

It is believed that by providing a pet food composition as provided for above, making it available to minders or owners of elderly pets and drawing attention to the prospect that regular feeding of the composition to such pets can bring about at least a temporary reversal of at least some of the signs of aging in their pet, the pet minder will be encouraged to administer the pet the composition of a regular basis. A suitable way of drawing the attention of the minder to the benefits of the composition would be by way of notice on the packaging of the food composition, alternatively by separate advertising thereof.

Numerous modifications may be made to the embodiments described above without departing from the scope of the invention. Specific examples are now described for further illustration.

Example 1

Thirty six cats are used in a trial. The cats are at least 10 years of age and are in a frail or borderline frail condition. Both male and female cats are used and the numbers are roughly equal across treatments. The cats are screened for hyperthyroidism.

The cats are separated into 4 groups of 9 cats each. Each group has roughly the same amount of hyperthyroid cats as any other group. Also, the male:female ratio for each group is roughly the same.

Each cat is housed in a cage and is subjected to a light cycle of 12 hours darkness and 12 hours light. The temperature is ambient. The cages are cleaned daily. Each cat has ad libitum access to food and water except prior to the taking of any blood sample when the cats are fasted overnight.

All cats are fed a canned control diet for a pre-test period of 7 weeks. A blood sample is taken and blood superoxide dismutase levels, calcium, Complete Blood Count (hemoglobin, hematocrit, red blood cell number), albumin and protein are determined.

Each group of cats is then fed a different diet for a period of 6 months. The diets are as follows:

Control Diet:—A canned pet food which is highly palatable to cats. The food contains 24.7% added water, about 73.7% meat, about 1% starch and flavors, minerals and vitamins; all by weight. The food contains normal levels of vitamins and minerals.

Diet A:—The control diet but containing an additional 5 mg/1000 kcal of β-carotene and 100 IU/1000 kcal of vitamin E;

Diet B:—The control diet but containing an additional 3 g/100 kcal calcium, 1500 IU/1000 kcal vitamin D, 0.05 mg/1000 kcal vitamin D and 40 mg/1000 kcal zinc.

Diet C:—The control diet but containing and additional 5 mg/1000 kcal of β-carotene, 100 IU/1000 kcal of vitamin E, 3 g/100 kcal calcium, 1500 IU/1000 kcal vitamin D, 0.05 mg/1000 kcal vitamin K and 40 mg/1000 zinc.

The cats are examined upon commencement of the trial, after 3 months and after 6 months. The examination includes:

a physical examination;

a subjective assessment of body condition;

determination of blood superoxide dismutase levels, calcium balance, Complete Blood Count (hemoglobin, hematocrit, red blood cell number), albumin and protein.

The results are as follows:

| Change in: | Control Diet | Diet A | Diet B | Diet C |
|---|---|---|---|---|
| Surviving cats | 75% | 75% | 55% | 100% |
| Hematocrit (%) | 1.5 | 3.6 | −0.4 | 3.6 |
| Red Blood cell (m/cu mm) | 0.101 | 0.976 | −0.23 | 0.621 |
| Total protein | −0.6 | −0.3 | −0.8 | 0.3 |

All cats fed Diet C have improved longevity. The cats fed diets A and C have a significant improvement in hematocrit, hemoglobin, and red blood cell levels. Indeed, these represent at least a partial reversal to levels associated with far younger cats. While total blood protein decreases in cats fed the control diet, it does not decrease in cats fed diets A and C. Decreased hemoglobin, hematocrit, red blood cell number, and protein are commonly observed in elderly pets. Diet B, which contains calcium but not the antioxidant vitamins A and E, performs worse than the control. Hence combining calcium with the antioxidant vitamins A and E offers a surprising and synergistic improvement.

Example 2

The effect of the diet of the present invention was monitored over a period of six months in a group of thirty six elderly cats. Each cat was over 8 years of age at commencement of the trial. The cats were divided into two groups (Control and Diet A) of 18 cats each having similar age profiles. The cats are screened prior to being chosen for the trial to eliminate those with known pre-existing disease conditions. Preliminary screening is performed by: physical examination, cbc, serum chemistries, thyroid hormone and urinalysis including urine protein/creatinine ratio. These parameters are all routinely recommended in the veterinary evaluation of geriatric pets. In each group, cats are blocked for assignment to diets on the basis of sex, age, and a "health status" parameter to be derived from initial screening tests listed above Each cat is housed in a cage and is subjected to a light cycle of 12 hours darkness and 12 hours light. The temperature is ambient. The cages are cleaned daily. Each cat has ad libitum access to food and water. For a month prior to commencement of the trial, both groups are fed a standard diet, available commercially under the brand name Friskies Salmon.

From the commencement date, Control continued to be fed the Friskies Salmon diet as a control, while Diet A was fed a diet consisting of Friskies Salmon plus the following additives: 5 mg/1000 kcal of β-carotene and 100 IU/1000 kcal of vitamin E. Calcium content was approximately 4.5 g/1000 kcal ME.

Each participating cat wears a collar having an activity monitor that contains an accelerometer mounted thereon. The activity monitor was a model Actiwatch 16 manufactured by Mini Mitter Co., Inc., (Sunriver, Oreg., USA). The activity monitor is capable of sensing any motion and integrates degree and intensity of motion. The monitor provides the data tabulated below:

TABLE 1

Average Activity per 24 hours

| Diet | 0 months | 6 months | Change from Initial | % of Cats With Increase |
|---|---|---|---|---|
| Control | 112'603 | 59'958 | −52'644 | 0.0 |
| Diet A | 65'056 | 84'205 | 19'148 | 100.0 |

TABLE 2

Number of Minutes Active per Day

| Diet | 0 months | 6 months | Change from Initial | % of Cats With Increase |
|---|---|---|---|---|
| Control | 90.4 | 40.1 | −50.3 | 0.0 |
| Diet A | 52 | 61.8 | 9.8 | 100.0 |

TABLE 3

Number of Minutes Alert or Active per Day

| Diet | 0 months | 6 months | Change from Initial | % of Cats With Increase |
|---|---|---|---|---|
| Control | 370.9 | 235.7 | −135.2 | 0.0 |
| Diet A | 252.2 | 298.3 | 46 | 100.0 |

TABLE 4

Number of Hours Alert or Active per Day

| Diet | 0 months | 6 months | Change from Initial | % of Cats With Increase |
|---|---|---|---|---|
| Control | 6.18 | 3.93 | −2.25 | 0.0 |
| Diet A | 4.20 | 4.97 | 0.77 | 100.0 |

TABLE 5

Average Activity per Alert or Active Period (Activity Score/Min)

| Diet | 0 months | 6 months | Change from Initial | % of Cats With Increase |
|---|---|---|---|---|
| Control | 299.4 | 255.6 | −43.9 | 0.0 |
| Diet A | 227.5 | 256.5 | 29.0 | 66.7 |

The cats in the control diet group (Control) experience a decline in activity. This decline is in line with expectations for a 6 month period at their age. In contrast, elderly cats fed on the antioxidant-containing diet of Diet A demonstrate remarkable increases in activity levels. This provides evidence of an increase in ease of movement and therefore of a general improvement in quality of life.

The invention claimed is:

1. A method for improving the condition for elderly cats, the method comprising administering to the elderly cat an effective amount of a nutritional composition which contains a calcium source, a source of vitamins D, E and K, and β-carotene.

2. A method according to claim 1 in which the nutritional composition includes a zinc source.

3. A method according to claim 1 in which nutritional composition is a nutritionally complete pet food.

4. A method according to claim 1 in which the nutritional composition further comprises a prebiotic and/or a probiotic micro-organism.

5. A method according to claim 4 in which the prebiotic is selected from the group of inulin, fructooligosaccharides and plant materials which contain inulin and/or fructooligosaccharides.

6. A method according to claim 1 in which the nutritional composition further comprises a source of glutamine.

7. A method for increasing the longevity of an elderly cat, the method comprising administering to the elderly cat an effective amount of a nutritional composition which contains a calcium source, vitamins D, E and K, and β-carotene.

8. A method according to claim 7 in which the composition comprises a vitamin source providing vitamin E.

9. A method according to claim 7 in which the nutritional composition includes a zinc source.

10. A method according to claim 7 in which the nutritional composition is a nutritionally complete pet food.

11. A method according to claim 7 in which the nutritional composition further comprises a prebiotic and/or a probiotic micro-organism.

12. A method according to claim 11 in which the prebiotic is selected from the group of inulin, fructooligosaccharides and plant materials which contain inulin and/or fructooligosaccharides.

13. A method according to claim 7 in which the nutritional composition further comprises a source of glutamine.

14. A method according to claim 7 in which the composition is administered in an amount effective to increase the activity level of the pet.

15. A method for increasing the longevity of an elderly cat, the method comprising administering to the cat an effective amount of a nutritional composition which contains a calcium source, a zinc source, β-carotene at a level of at least 4 mg/1000 kcal, and vitamin E at a level of at least 75 IU/1000 kcal.

16. A method according to claim 15 in which the elderly cat is administered a daily amount of at least about 0.25 mg/kg body weight of β-carotene, at least about 3.5 IU/kg body weight of vitamin E, at least about 0.15 g/kg body weight of calcium and at least about 2.5 mg/kg body weight of zinc.

17. A method of increasing the activity level of an elderly cat, the method comprising administering to the cat an effective amount of a nutritional composition which contains a calcium source, a zinc source, β-carotene at a level of at least 4 mg/1000 kcal, and vitamin E at a level of at least 75 IU/1000 kcal.

18. A method for reducing a sign of aging in an elderly cat, the method comprising the steps of providing a pet food composition comprising a source of calcium, a source of zinc, a source of β-carotene, and a source of vitamin E, making the composition available to a minder of an elderly pet, providing means of encouraging the pet minder to administer the said composition to the pet on a regular basis, and administering said composition to the pet.

19. A process according to claim 18 wherein the foodstuff is capable of providing the pet a daily amount of at least about 0.25 mg/kg of the pet's body weight of β-carotene, at least about 3.5 IU/kg body weight of vitamin E, at least about 0.15 g/kg body weight of calcium and at least about 2.5 mg/kg body weight of zinc.

20. A method for the increasing of total blood protein in an elderly cat, the method comprising administering a composition having been formulated to provide at least about 0.25 mg/kg of the cat's body weight of β-carotene, at least about 3.5 IU/kg body weight of vitamin E, at least about 0.15 g/kg body weight of calcium and at least about 2.5 mg/kg body weight of zinc when fed as a complete meal.

21. A method for increasing the physical energy levels in an elderly cat, the method comprising administering an effective amount of a nutritional composition which contains a calcium source, a zinc source, β-carotene and vitamins D and E.

22. A method for reducing a sign of aging in an elderly cat, the method comprising the step of administering a composition comprising a source of calcium, zinc, β-carotene, and a source of vitamin E.

* * * * *

UNITED STATES PATENT AND TRADEMARK OFFICE
CERTIFICATE OF CORRECTION

| | |
|---|---|
| PATENT NO. | : 7,211,280 B1 |
| APPLICATION NO. | : 10/070777 |
| DATED | : May 1, 2007 |
| INVENTOR(S) | : Young et al. |

It is certified that error appears in the above-identified patent and that said Letters Patent is hereby corrected as shown below:

On The Title Page, Item (54)

In the Title change "CONDITION OF ELDERLY PETS" to --IMPROVING CONDITION OF ELDERLY PETS--.

Signed and Sealed this

Thirtieth Day of October, 2007

JON W. DUDAS
*Director of the United States Patent and Trademark Office*